H. F. CROMWELL.
Plow.
No. 26,655.
Patented Jan. 3, 1860.
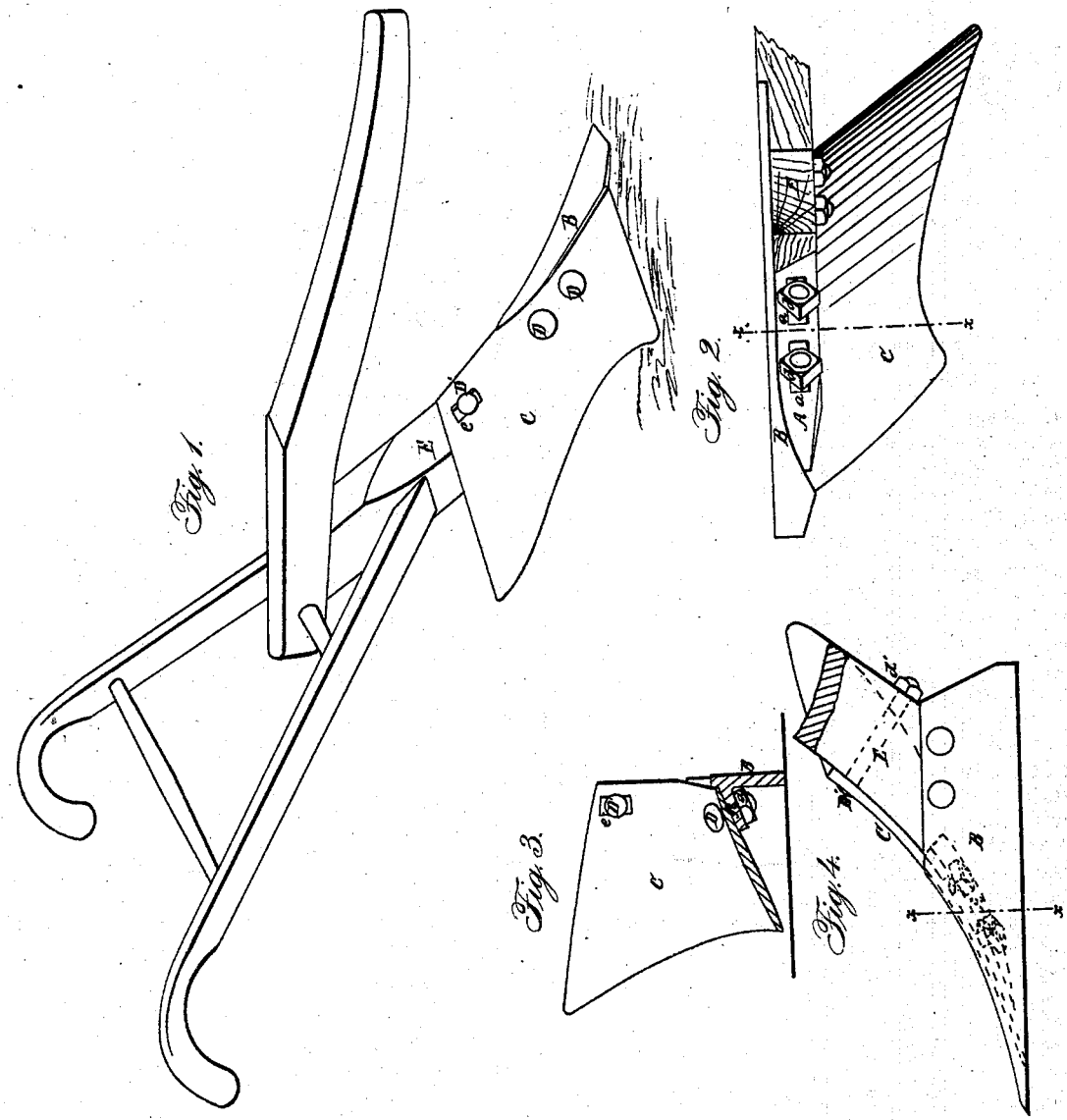

UNITED STATES PATENT OFFICE.

HENRY F. CROMWELL, OF CYNTHIANA, KENTUCKY.

IMPROVEMENT IN PLOWS.

Specification forming part of Letters Patent No. 26,655, dated January 3, 1860.

*To all whom it may concern*

Be it known that I, HENRY F. CROMWELL, of Cynthiana, Harrison county, Kentucky, have invented a certain new and useful Improvement in Plows; and I hereby declare the following to be a full, clear, and exact description of the same, reference being had to the accompanying drawings, making part of this specification, and in which—

Figure 1 is a perspective view. Fig. 2 is a view of under side, showing adjusting device. Fig. 3 is a section at x x, Figs. 2 and 4. Fig. 4 is an elevation of landside.

A is a flange projecting inwardly from the side of the bar B, and having two oblong holes or slots, a. The upper land-side corner of the wing C has also a slot, c.

D are short bolts countersunk into the wing C, and passing through the slots a in the flange A, beneath which they are secured by nuts d.

D' is a long bolt passing through the slot c in the wing C, and through the sheth E, as represented, beneath which it is secured by a nut, d'. The slots a and c render the wing adjustable in respect to the bar and sheth and the bolts D D', and nuts d d' serve to secure it firmly in any position desired.

The flange A, sheth E, and wing C all have the form of a cylindrical segment, so that the wing in every position of adjustment possesses a firm and solid bearing both upon the bar and upon the sheth. By this means the frequent necessity of "drawing out" or "relaying" the working-edge of the wing is avoided. The flange A greatly stiffens the bar B in a lateral direction.

I do not claim to be the first to construct a plow with an adjustable wing or mold-board, but my arrangement of parts is such as to give to an implement possessing such adjustability greater economy of construction as well as superior compactness, strength, and durability.

I claim as new and of my invention herein and desire to secure by Letters Patent—

The described arrangement of the cylindrically-curved frame-timber or sheth E, wing C, flange A, bar B, slots a and c, and bolts D and D', the whole being constructed and combined in the manner and for the purposes set forth.

In testimony of which invention I hereunto set my hand.

H. F. CROMWELL.

Witnesses:
GEO. H. KNIGHT,
FRANCIS MILLWARD.